April 12, 1927.
G. J. THOMA
1,624,691
METHOD FOR THE INSTANTANEOUS SETTING OF GLUE BETWEEN SURFACES
Filed July 26, 1926
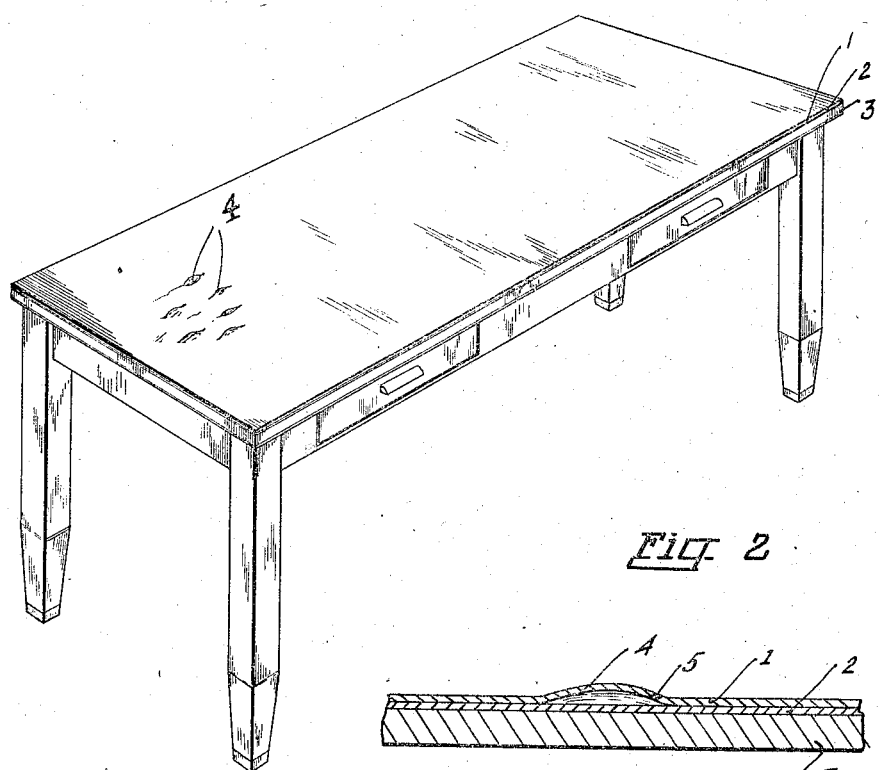
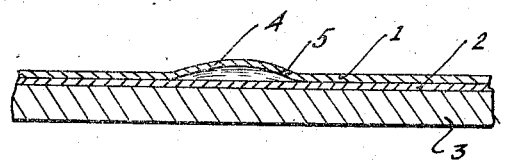
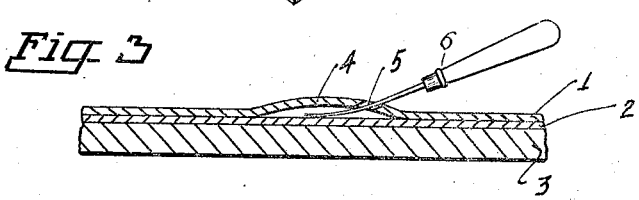
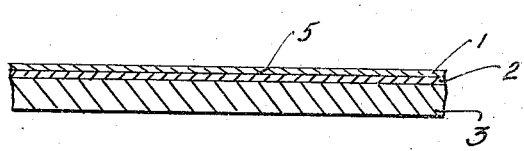
Inventor
George J. Thoma
Attorney
Thomas Bilyeu Patented Apr. 12, 1927.

1,624,691

UNITED STATES PATENT OFFICE.

GEORGE J. THOMA, OF PORTLAND, OREGON.

METHOD FOR THE INSTANTANEOUS SETTING OF GLUE BETWEEN SURFACES.

Application filed July 26, 1926. Serial No. 125,115.

The object of my invention, consists primarily, and used by me in the repairing of furniture, wherein blisters, or raised surfaces, occur upon the finished surface of veneered furniture. The vesicle to be repaired generally occurs between the laminæ, the finer upper layers of veneer. Heretofore it has been the custom where these blisters occur in any quantity to resurface the blistered surface which was not only expensive in time but in material as well. In my new and improved method I accomplish the repairing of these blisters without the aid of clamps or the expense of any considerable time and wherein a minimum amount of labor and material is required.

I am aware that heretofore pressure or heat has been used externally in effecting the quick setting of glued surfaces, but I am not aware that the same has been effected quickly wherein the surface can be immediately refinished as may be done by my treatment and placed in stock or use.

A still further object of my invention, consists in providing a method wherein and whereby glued surfaces of substantial area may be glued together and finished almost instantly by the application of artificial heat in substantial quantity and the application of pressure during the application of the heated surface to one or both of the surfaces to be glued together.

With these and incidental objects in view, the invention consists in certain novel features of application and methods of procedure, the essential elements of which are set forth in the appended claims, and a preferred form of embodiment of which is hereinafter shown with reference to the drawings which accompany and form a part of this specification.

In the drawings:—

Fig. 1 is a perspective view of a table top, a block of veneered material consisting primarily of a core and the veneered surface.

Fig. 2 is a sectional view, showing and illustrating a blister, treatment by my method.

Fig. 3 is a sectional view through a blister in the first stage of treatment.

Fig. 4 is a sectional view of the same as that illustrated in Fig. 3 with the work shown completed.

Like reference characters refer to like parts throughout the several views.

1 is the upper layer of veneer, which is glued to a second layer 2, the two layers usually run in opposite directions. The core or base of the built up product is shown at 3. The vesicle is shown at 4 and generally occurs upon the upper surface 1. The slit that I form in the raised surface is shown at 5. The tool used for working in the glue between the laminæ is shown at 6, and is so made that a flexible point is provided to facilitate the work.

Where too much time has not elapsed or a fair quantity of the dried glue remains disposed under the blister, I have accomplished satisfactory results by the application by my heated iron and by working the blister down to a true surface without slitting the raised surface, find that the same may be retained in place by the simultaneous application of heat and pressure. At other times I get best results by the placing of an additional amount of glue in the space created by the raised blister, and then reduce the blister by working the raised surface down to a true surface by the simultaneous application of heat and pressure.

I have found best results are obtained when I slit the raised surface at or near the base of the raise, as is shown in Fig. 3 and wherein the slit is made for the full length of the raised surface, the slit is made at an angle to the material being incised. If the glue has hardened or dried, I then work a quantity of liquid glue into the space disposed between the laminæ after which I apply a heated iron to the surface and press the two surfaces to be united until complete contact is formed between the two veneer surfaces. The iron should be sufficiently heated to cause an instantaneous setting of the glue but not hot enough to scorch, or burn, the wood surfaces. Veneered surfaces treated in this manner wherein heat and pressure are applied simultaneously not only corrects the defect but I have applied this method to a very large number of defects of this character and the method permanently corrects the defect.

While I have here described my method in its application to the repairing of veneered surfaces the same may be used with good results in the repairing of damaged edges or indented surfaces, or in the repair of damaged edges, where heat is simultaneously applied with the application of pressure.

While this form of treatment in its specific form is adequate for the work to be done I do not wish to be strictly limited to the exact form of application herein described as the same is susceptible to other forms of application, all coming within the scope of the claims which follow:

What I claim is:—

1. A method of repairing blisters on veneered furniture consisting of slitting the blister at the base, the placing of glue between the raised surface and the next surface disposed thereto and the simultaneous application of heat and pressure during the setting of the glue.

2. A method of repairing blisters formed upon veneers consisting of slitting the blister, applying glue material through the slit and the pressing of the blister into place with a heated element to intensify the setting of the glue.

GEORGE J. THOMA.